Feb. 1, 1927.
G. W. HEISE ET AL
1,615,839
PRIMARY GALVANIC CELL AND ELECTRODE THEREFOR
Filed Feb. 1, 1924      2 Sheets-Sheet 1
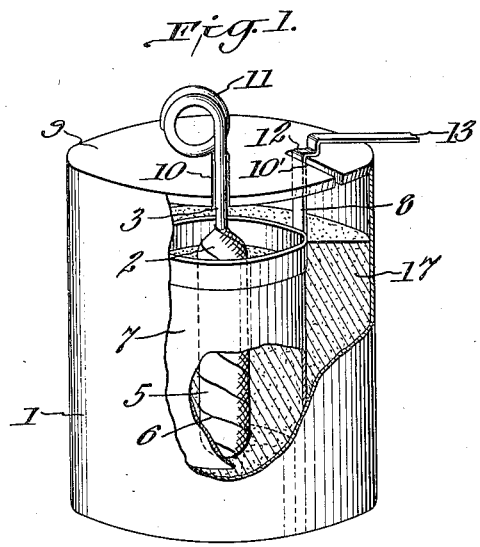
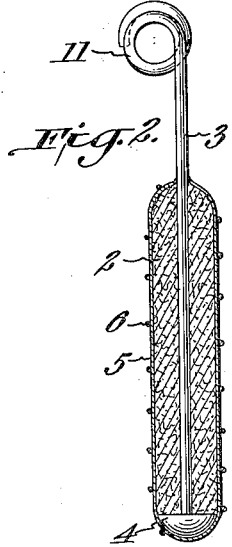
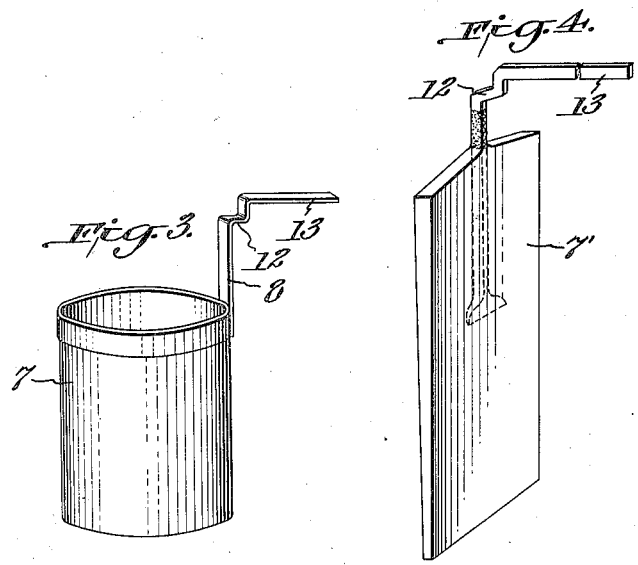
Inventors:
George W. Heise,
Erwin A. Schumacher,
By Byrnes, Townsend & Brickenstein
Attorneys.

Feb. 1, 1927.  1,615,839
G. W. HEISE ET AL
PRIMARY GALVANIC CELL AND ELECTRODE THEREFOR
Filed Feb. 1, 1924  2 Sheets-Sheet 2
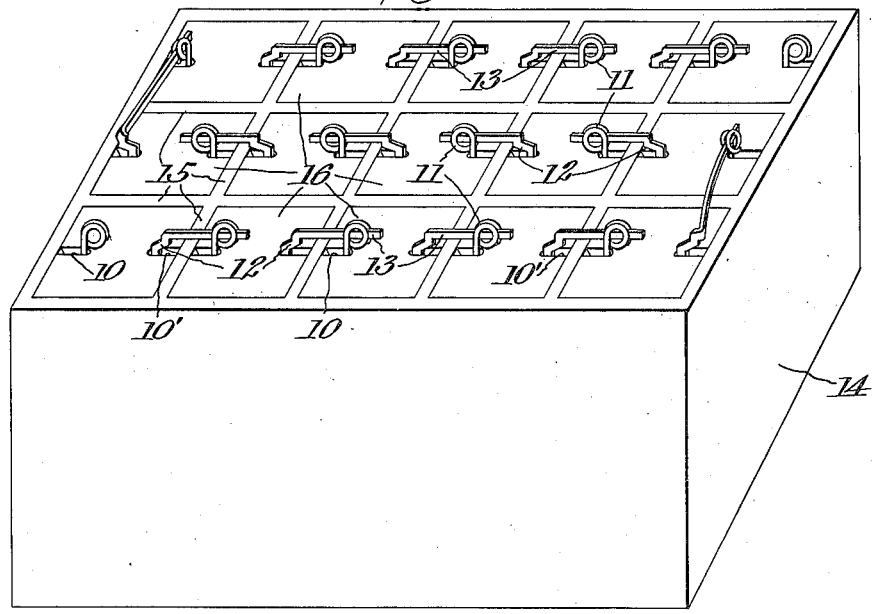
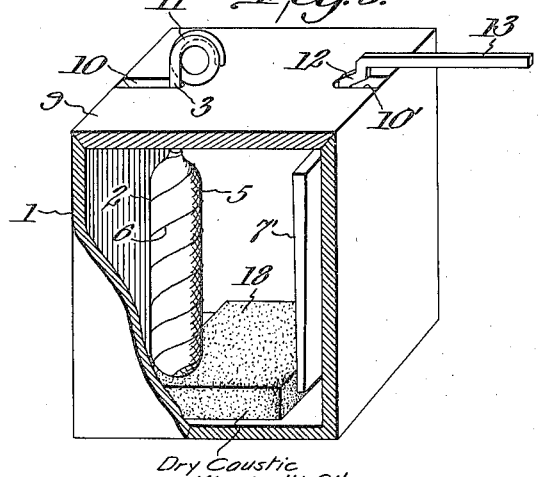
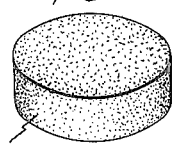

Patented Feb. 1, 1927.

1,615,839

UNITED STATES PATENT OFFICE.

GEORGE W. HEISE, OF BAYSIDE, AND ERWIN A. SCHUMACHER, OF BROOKLYN, NEW YORK, ASSIGNORS TO NATIONAL CARBON COMPANY, INC., A CORPORATION OF NEW YORK.

PRIMARY GALVANIC CELL AND ELECTRODE THEREFOR.

Application filed February 1, 1924. Serial No. 690,013.

This invention relates to improvements in cells of the zinc-caustic alkali-copper oxid type. Particular objects of the invention are to provide efficient small cells with replaceable parts, and compact battery assemblies made from such cells; to provide dry caustic in convenient form for use when the cells are to be energized subsequent to shipment or storage; to make deferred action cells, activatable by addition of water, and ultimately containing either liquid or gelatinous electrolyte; and to secure other advantages, as subsequently described.

Reference is to be made to the accompanying drawings, in which—

Fig. 1 is a perspective view, broken away in part, showing one form of the improved cell;

Fig. 2 is a vertical section through the copper oxid element of Fig. 1;

Fig. 3 is a perspective view of the zinc element of Fig. 1;

Fig. 4 is a perspective view of another form of zinc electrode;

Fig. 5 is a perspective view of an assembly of cells;

Fig. 6 is a perspective view, broken away in part, showing a cell prior to activation and containing a mass of dry caustic; and Fig. 7 is a perspective view of another form of caustic tablet.

Referring to Figs. 1 to 3, numeral 1 denotes a container which may be formed of hard rubber, glass, or other suitable material. The size and configuration of the container may be varied as desired. The invention, however, is particularly adapted to small cells. The cylindrical cell shown in Fig. 1 may be considered to be drawn to scale and will serve as an example of a preferred form.

The copper oxid element 2 comprises a central conductor 3, which is expanded at the bottom to form supporting shoulders 4. The conductor may advantageously be made of copper or iron. The copper oxid may be shaped about the conductor in various ways, as by tamping or extrusion. In order to secure a coherent body, it is desirable to moisten the oxid with sodium hydroxid, sodium silicate, or equivalent bonding material, and to bake the moist, shaped mass at a low heat, for example around 150° C. We have discovered that the coherence of the copper oxid depolarizing mass may be greatly increased by the initial incorporation of a small percentage of fibrous asbestos. The quantity of asbestos may be widely varied, but 1 to 2% is ordinarily satisfactory.

The copper oxid depolarizers will be subject to separate handling, as they will serve as replacements in carrying out the renewable-element feature of the invention, referred to above. It is necessary, therefore, to provide especially against disintegration, and this we do by covering the element with paper, muslin, or similar fabric 5. A thread or fine wire 6 may secure the covering. The depolarizing elements may be wrapped in sheet material, or a paper-like layer may be formed directly upon them, as by distributing a moist wood pulp composition over their surfaces and then drying. The composition may be applied by spraying, brushing, or in other suitable ways. Alternatively, the elements may be given a coating of an adhesive material, and may then be rolled in cellulosic material adapted to form a protective layer. In an application Serial No. 716,267, filed May 27, 1924, by George W. Heise, coated or wrapped copper oxid depolarizers are described and claimed, and the beneficial function of cellulosic material or the like adjacent to the surface of the copper oxid is shown.

The zinc electrode 7 (Fig. 3) comprises a tubular body of zinc and a connector 8 secured to the body. The zinc is preferably cast and suitably amalgamated, as by incorporation of about 1% by weight of mercury. The connector may be anchored in the zinc during the casting operation. The zinc electrodes may have any suitable shape; there is no limitation to that shown. A wedge-shaped zinc electrode 7', such as that shown in Fig. 4, may be provided. The cell container might be made of zinc and would serve as an anode, but this is not preferred, since corrosion of the container would finally make it necessary to discard the cell.

The electrodes 2 and 7 are supported by cell cover 9 which may be a sheet of hard rubber, pulpboard, or the like having slots 10 and 10'. The conductor of the copper oxid element is extended and coiled to form a clip connection 11 which rests upon the cover when the conductor is fitted in slot 10. Similarly, the connector 8 of the zinc is extended and offset to form a shoulder 12, overlying the cover when the connector is inserted in slot 10'. The connector is bent at right angles to the shoulder to form an arm 13. This is adapted to fit in the clip connection 11 of an adjacent cell or to be otherwise connected in circuit.

This construction provides for ready replacement of either or both electrodes, and the electrolyte, whenever it may be necessary. The cover may be lifted by means of the projecting parts of the connectors, the electrodes may be slipped out and new ones inserted, and the cover replaced, without making any mechanical adjustments or electrical connections. Electrodes of the type described may be made for sale at small cost, so that there is marked economy in the use of the renewable cell, as compared with those which must be discarded when one element is exhausted.

Various battery combinations may be made with the improved cells, but we have found one of the most desirable to be that illustrated in Fig. 5. A box 14 is provided with partition walls 15 forming compartments 16 therein. The box may be made of any suitable non-conducting material, such as waterproofed wood, hard rubber, glass, or the like. The structure of the individual cells is similar to that described previously. The battery is especially adapted for furnishing small currents and may be used with advantage in radio reception. An 18 volt "B" battery requires 25 high voltage (sulfured copper oxid) cells or 30 cells with non-sulfured depolarizer. Since the individual cells are of small volume and are very compactly arranged, this number does not occupy an objectionable amount of space.

In Fig. 1 the cell is shown as supplied with oil-covered electrolyte 17, which may be liquid or gelatinous. It is frequently desirable, however, to keep the cell or battery in dry condition during the period of shipment and storage. We have provided practical means for accomplishing this.

Referring to Fig. 6, a tablet of dry caustic alkali 18 is provided in the bottom of the cell. This tablet contains the proper amount of caustic for the electrolyte. Various means may be adopted for preventing deliquescence of the caustic. Admixture with oil has this effect. The oils usually used as a protective layer, for example engine oil, are suitable. About 20 parts by weight of oil to 100 parts of caustic gives good results. When water is poured into the cell the caustic dissolves and the oil rises to the surface of the solution. Additional oil may be added, if necessary to form a protective layer of adequate thickness.

When a gelatinous electrolyte is desired, starch or other gelatinizable material may be included in the caustic tablet. Such compositions are described and claimed in U. S. Patent No. 1,484,784, of February 26, 1924. A small amount of oil may be added to increase the rigidity of the gel formed after water has been added. A suitable composition is composed of 20 parts by weight of caustic alkali, 2.5 parts of starch, and 0.5 parts of oil. The proportions may be varied considerably.

The caustic may be protected by a suitable wrapping or removable surface layer, but the compositions described are ordinarily substantially unchanged on standing in contact with the air.

In the provision of efficient and economical renewable-element cells, as described herein, we have devised certain new constructions and novel combinations of these with structures old in the art. These constructions and combinations may be variously modified, within the scope of the appended claims.

We claim:

1. A galvanic cell comprising a container, a removable cover therefor having slots extending inwardly from the margin, electrodes each having a conductive member received in one of said slots, said members each having a portion shaped to rest upon the cover and to support the electrodes therefrom, the terminal portion of one of said members being adapted to resiliently grasp an elongated connecting member.

2. A galvanic cell comprising a non-corrodible container, a removable cover therefor having slots extending inwardly from the margin, a copper oxid electrode provided with a conductive member received in one of said slots, said member being bent terminally to form a coil resting upon the cover, and a zinc electrode having an extended portion received in another of said slots and offset to form a supporting and connecting member.

3. A galvanic cell electrode comprising a mass of depolarizing oxid, a conductor embedded in said mass and extending therefrom, the extended portion of said conductor being bent terminally to form a clip connector.

4. A galvanic battery made up of a plurality of cells, each cell comprising a removable cover, positive and negative electrodes having integral terminal portions projecting through the cover and adapted to loosely suspend the electrodes therefrom, the terminal portion of one of each of said electrodes being so shaped as to positively engage the end of the terminal portion of an electrode of opposite polarity of the next adjacent cell, said cells being connected in series by means of said terminal portions.

5. A galvanic battery made up of a plurality of cells, each cell comprising a removable cover, a pair of electrodes with integral terminal portions projecting through and bent to overlie the cover so as to suspend the electrodes therefrom, the terminal portion of one of each of said electrodes being so shaped as to resiliently grasp the terminal portion of the electrode of opposite polarity of the next adjacent cell, said cells being connected in series by means of said terminal portions.

In testimony whereof, I affix my signature.
GEORGE W. HEISE.

In testimony whereof, I affix my signature.
ERWIN A. SCHUMACHER.